W. L. SHAFFER & J. F. WOOD.
Improvement in Apparatus for Treating Cane Juice.

No. 132,417.  Patented Oct. 22, 1872.

UNITED STATES PATENT OFFICE.

WILLIAM L. SHAFFER AND JOHN F. WOOD, OF CHACAHOULA STATION, LA.

IMPROVEMENT IN APPARATUS FOR TREATING CANE-JUICE.

Specification forming part of Letters Patent No. 132,417, dated October 22, 1872.

*To all whom it may concern:*

Be it known that we, WILLIAM L. SHAFFER and JOHN F. WOOD, residing at Chacahoula Station, in the parish of Terre Bonne and State of Louisiana, have invented a certain Improvement in Machines for Defecating Cane-Juice, of which the following is a specification:

This invention relates to that class of machines which are used in the manufacture of sugar to defecate and bleach the cane-juice as it is received from the mill, sulphurous acid being forced into the closed tank through which the juice passes from the mill to the kettles and thoroughly incorporated therewith by means of a rapidly-revolving wheel, which throws the cane-juice into spray. Our improvement consists in the employment, in combination with the wheel, of an elevation, placed at the end of the tank in close proximity to the wheel, upon which the juice is elevated by the action of the wheel, and from which it flows directly into the evaporators. This dispenses with the use of a pump or other device for elevating the juice into the evaporators.

Figure 1:
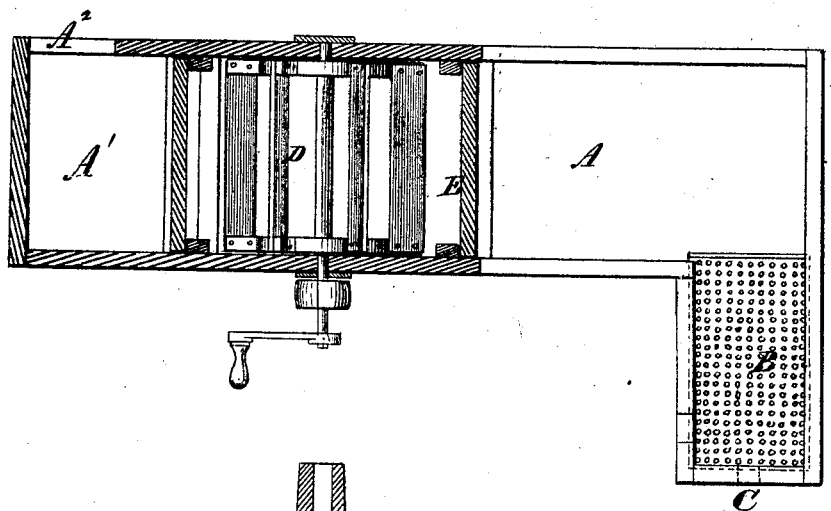
Figure 2:
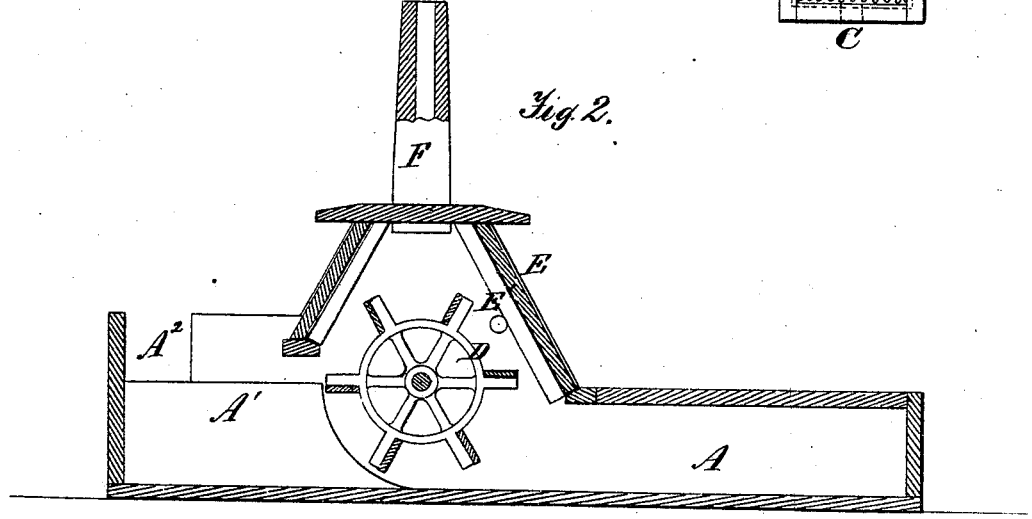
Figure 3:
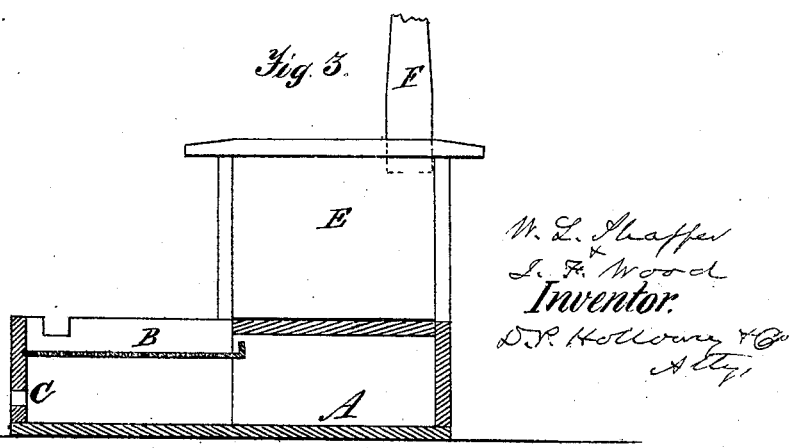

Figure 1 is a sectional plan view of our improved machine. Fig. 2 is a vertical longitudinal section thereof. Fig. 3 is a transverse section of the same.

The same letters of reference are employed in all the figures in the designation of identical parts.

The cane-juice received from the mill enters the tank A above the strainer B, in passing through which it is freed from pieces of cane and other impurities. Just beneath the strainer an aperture, C, is formed in the end of this part of the tank, to be covered by the end of a pipe, connected at its other end with a retort or receiver containing sulphurous acid. This sulphurous acid, passing through the cane-juice as it descends through the strainer in a finely-comminuted state, is to a great extent absorbed thereby for purposes of purification and bleaching. Near the other end of the tank A, and operating in close proximity to an elevation, $A^1$, therein, is a paddle-wheel, D, turning on a horizontal axis at the rate of, say, one hundred and twenty revolutions per minute, throwing the cane-juice up and dashing it into spray. The wheel is covered by the house E, having an aperture, $E^1$, in one of its walls, through which sulphurous acid is injected to be incorporated with the juice. The excess of sulphurous acid is discharged through the uptake F. The cane-juice after having been subjected to the action of the wheel passes through the opening $E^2$ in the house E upon the elevation $A^1$, and is finally discharged from the machine at $A^2$ upon the side.

What we claim as our invention, and desire to secure by Letters Patent, is—

In a machine for defecating cane-juice, the combination of the tank A, wheel D, and elevation $A^1$, substantially as and for the purpose specified.

In testimony whereof we have signed our names to this specification in the presence of two subscribing witnesses.

WM. L. SHAFFER.
    J. F. WOOD.

Witnesses:
 R. W. COCKE,
 W. J. STRATTON.